United States Patent [19]
Seidler et al.

[11] 3,774,455
[45] Nov. 27, 1973

[54] URINE TESTING APPARATUS
[76] Inventors: David Seidler, 69-10 108th St.;
Herbert B. Feldman, 108-21 69th
Rd., both of Forest Hills, N.Y.
11375
[22] Filed: Dec. 22, 1971
[21] Appl. No.: 210,820

[52] U.S. Cl. ................ 73/444, 23/253 R, 23/259,
73/53, 73/421 R, 128/2 F, 128/295
[51] Int. Cl. ........................... G01n 9/12, G01n 1/18
[58] Field of Search ................... 73/53, 444, 421 R,
73/426, 427, 428, 429; 128/2 F, 295; 4/110;
23/253 R, 259, 292

[56] References Cited
UNITED STATES PATENTS
3,499,327  3/1970  Lane, Jr. ....................... 73/421 R
3,460,395  8/1969  Shaw ............................... 73/444 X
3,543,743  12/1970  Foderick ....................... 128/295 X
3,641,825  2/1972  Reid ................................. 73/444

Primary Examiner—Richard C. Queisser
Assistant Examiner—Joseph W. Roskos
Attorney—Alex Friedman et al.

[57] ABSTRACT

An apparatus for testing urine consists of a container and a float. The float, in combination with the container, makes it possible to measure the specific gravity of a urine sample. The container is designed for holding test strips impregnated with reagents. Sediment contained in the urine can be collected for microscopic examination.

9 Claims, 8 Drawing Figures

PATENTED NOV 27 1973

URINE TESTING APPARATUS

BACKGROUND OF THE INVENTION

Urine specific gravity is an important indicator of kidney function and the regulation of electrolyte concentration in a patient receiving intravenous fluid therapy for conditions such as extensive burns, shock or a variety of open lesions. Moreover, the presence of sediment can be an indication of certain pathological conditions as is the presence of sugar in the urine. Customarily, urine testing is carried out in a hospital laboratory or in the laboratory at a physican's office. Where the patient is confined to the home or where the urine sample cannot readily be brought to the laboratory it would be desirable that a variety of tests be conveniently carried out more or less at the bedside of the patient.

SUMMARY OF THE INVENTION

A disposable, portable container with an associated lid and a float make it possible to measure the specific gravity of a urine sample. The container is configured to allow simple collection of the urine and relocation for specific gravity testing. The interior of the container is tapered in order to gather any sediment which may be present and a channel is provided in the interior of the container for holding chemically-impregnated test strips for the determination of constituents in the urine such as sugar.

In a modification of the container lid, a tube is provided which is suitable for centrifuging without the need for a separate test tube.

Accordingly, an object of the present invention is to provide an improved urine testing apparatus which is portable and disposable and in which tests can readily be made.

Another object of the invention is to provide an improved urine testing apparatus in which the specific gravity of a sample of urine may be determined.

A further object of the invention is to provide an improved apparatus in which chemical tests using chemically-impregnated test strips may be conveniently carried out on a urine sample.

Still another object of the invention is to provide an improved apparatus in which sediment in urine can be collected.

Yet another object of the invention is to provide an apparatus in which sediment in a urine sample can be examined by means of a microscope.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
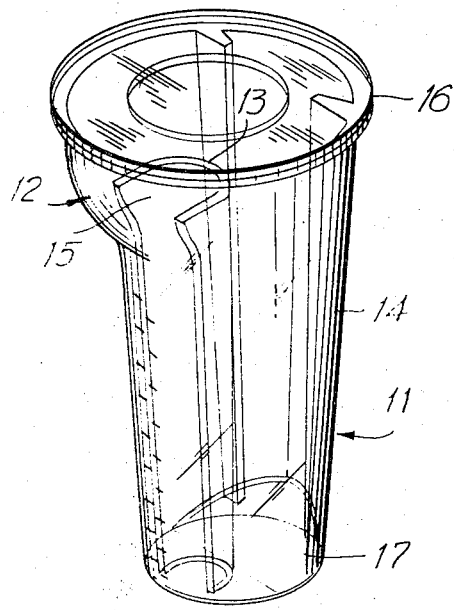
FIG. 1 is a perspective view of a urine testing apparatus constructed in accordance with a preferred embodiment of the present invention.
Figure 3:
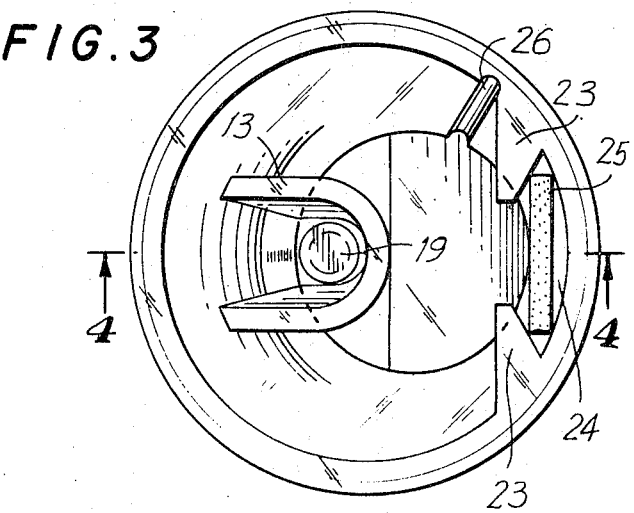
FIG. 3 is a top plan view of the apparatus of FIG. 1 with the lid removed and the float in position.

The container of the present invention, intended for carrying out tests on a urine specimen is preferably molded in one piece of a transparent resin. Such a container is shown in FIG. 1 where it is generally indicated by the reference numeral 11. The urine container is flared unsymmetrically near the top thereof as shown at 12. Immediately below the flare is a wall 13, where in combination with the wall 14 forms an essentially tubular, vertical compartment 15. The container is fitted with a tightly fitting lid 16.

In collecting the urine specimen, the urine is most easily directed into that portion of the container exterior to the compartment 15.

Figure 4:
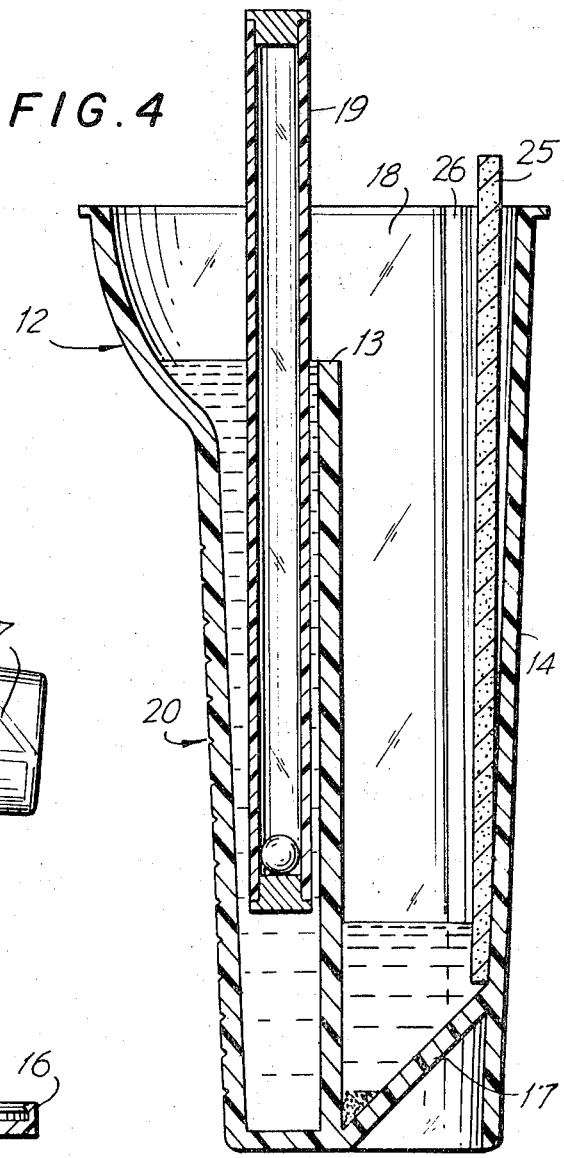
FIG. 4 is a sectional view taken along the line 3—3 of FIG. 3.
Figure 2:
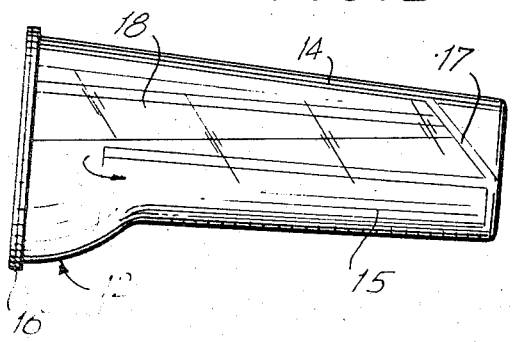
FIG. 2 is an elevational view of the FIG. 1 apparatus with lid in position and tipped to drain a urine sample into a special compartment.
Figure 8:
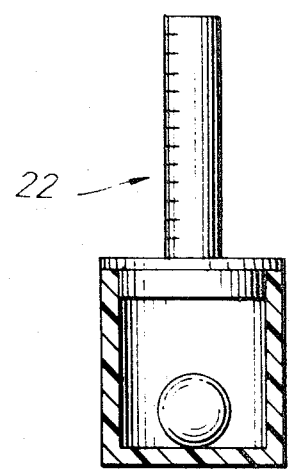
FIG. 8 is a sectional elevational view of modification of a float for measuring the specific gravity of urine.

Following the collection of the urine specimen, the container 11 is capped with the lid 16 and brought to the horizontal position shown in FIG. 2 with the flared section toward the bottom. The urine, initially in compartment 18 flows into the flared section 12, and when the container 11 is brought back to the normal vertical position the urine flows into compartment 15. To measure the specific gravity of the urine, a float 19 is inserted into the urine in compartment 15. The volume of urine must be great enough so that the urine in compartment 15 fills the compartment to the top of the wall 13 when the float 19 is placed in the compartment. The overall specific gravity of the float 19 is such that it is slightly lower than the minimum specific gravity expected in any urine sample. With this proviso, the float will reach a position wherein the bottom of the float is not in contact with the bottom of compartment 15. The specific gravity of the fluid can then be measured by means of graduations on the exterior of the container corresponding to the lowest point of float 19. In FIG. 4 graduations 20 are shown which make it possible to read the specific gravity of the urine as a function of the position of the float. The float 19 is particularly simple and inexpensive in construction. It consists of a tube of suitable length capped at both ends and containing an object 19a such as a ball, the weight of the object being such as to adjust the overall specific gravity of the float to the desired value. Since the object is not fixed in position, the float can be inserted into the specific gravity compartment 15 with either end up; the object will fall to the bottom of the float and stabilize it in that position. In another embodiment as shown in FIG. 8, the float has the customary shape of a hygrometer and graduations 22 are used for determining the specific gravity of the urine. The method, as is customary with hygrometers, is to note the graduation which coincides with the liquid surface.

For the purpose of carrying out analytical tests on a urine sample by means of various types of test papers, ridges 23 are molded into the wall of container 11. These ridges, in combination with the wall of the container, define a channel 24 in which a test strip 25 may conveniently be positioned. Any color changes in the test strip 25 are viewed through the transparent wall of the container 11.

Figure 5:
FIG. 5 is a side view in section of a lid for the container of FIG. 1, the lid being in inverted position.

Compartment 18 is tapered toward the bottom, as shown in FIG. 4. Here, a diagonal wall 17 is provided so that the bottom of the compartment 18 is wedge-shaped. Any sediment in the urine will collect at the point of the wedge. A groove 26 in the wall of the container makes it possible to decant the urine carefully and to withdraw the sediment with the last drops of urine. These last drops can be poured into the depression 27 in lid 16 (FIG. 5). The lid constitutes a convenient slide for placement under a microscope objective.

Figure 7:
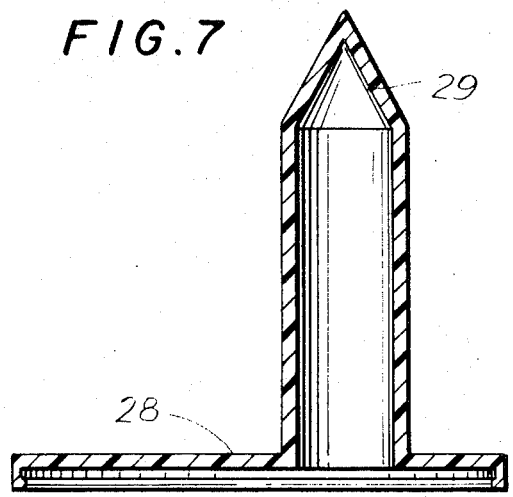
FIG. 7 is an elevational view in section of an embodiment of the cap suitable for use with a centrifuge for rapid collection of sediment.

Another form of lid 28 connected to a sealed tube 29 is shown in FIG. 7. The tube 29 together with lid 28 can be placed in a centrifuge (not shown) for rapid collection of any sediment.

Figure 6:
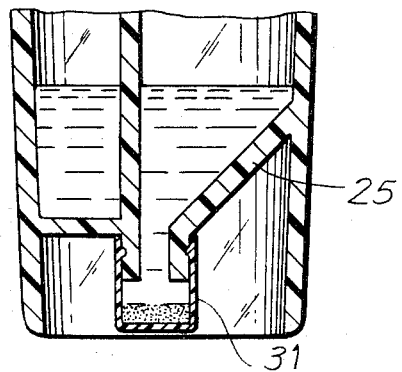
FIG. 6 is a partial sectional elevational view of an alternate embodiment of the present invention.

An embodiment of the container in which the sediment reaching the transverse wall 17 is diverted into a cap 31 is shown in FIG. 6. The cap can then be removed for examination of the sediment. A further advantage of this embodiment is that removal of cap 31 and discarding same makes it impossible to use the container again.

The invention described herein makes it possible to determine the specific gravity of very small urine samples simply by having the cross-section of compartment 15 small and only slightly greater than that of float 19. The device of the present invention is completely self-contained since the float and the needed test papers can be carried in the capped container. Several such urine test devices consequently can be easily carried by a physician on his rounds.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A disposable, portable apparatus for carrying out a variety of tests on a urine specimen comprising a transparent container, a tightly fitting lid for said container, a vertical compartment adjacent a wall of said container and extending from the bottom of said container to a region below the top of said container, an outward flare in that portion of said container immediately above said compartment, said flare being so dimensioned that tipping the covered container to a horizontal position with the flare below the body of the container and bringing the container back to the vertical position first transports the urine in said container into said flare and then pours said urine into said compartment, and a float for measuring the specific gravity of the urine in said compartment.

2. The disposable, portable apparatus as defined in claim 1, and including channel defining means extending inwardly from the sidewall of said container forming a channel into which a strip of test paper impregnated with a suitable reagent can conveniently be inserted for reacting with one or more compounds which may be present in said urine, said wall of said container constituting one wall of said channel thereby providing maximum visibility for any color changes which may occur in said test paper.

3. The disposable, portable apparatus as defined in claim 1, wherein that part of the interior of said container which is exterior to said compartment tapers to a small cross-section, thereby gathering together and enhancing the visibility of any sediment which may settle out of said urine.

4. The disposable, portable apparatus as defined in claim 3, wherein the wall of said container has therein an essentially vertical groove extending from said region of small cross-section to the brim of said container to facilitate removal of said sediment in a minimum quantity of liquid.

5. The disposable, portable apparatus as defined in claim 3, wherein said region of small cross-section ends in a cap removable from the bottom of said container, the sediment collected therein being simultaneously removed.

6. The disposable, portable apparatus as defined in claim 1, wherein said lid has a depression therein into which sediment which may settle out of said urine can be poured, and said lid with said depression is suitable for placing under a microscope for examination of said sediment.

7. The disposable, portable apparatus as defined in claim 1, wherein said lid includes a tube adapted to be placed in a centrifuge, so that sediment poured with urine into said tube may be rapidly separated.

8. The disposable, portable apparatus as defined in claim 1, wherein said float comprises a hollow tube capped at both ends and containing an object which brings the overall specific gravity of said float to a value slightly less than the minimum to be expected in any urine sample.

9. The disposable, portable apparatus as defined in claim 8, wherein said float can be used to measure the specific gravity of urine with either end up since said object will rest at that end which is downwardly disposed and will stabilize said float in that position.

* * * * *